(12) United States Patent
Van Valkenburg (10) Patent No.: US 9,517,548 B2
(45) Date of Patent: *Dec. 13, 2016

(54) DEVICE AND METHOD FOR HOLDING A TOOL BIT

(71) Applicant: Sjoerd Anne Van Valkenburg, The Hague (NL)

(72) Inventor: Sjoerd Anne Van Valkenburg, The Hague (NL)

(*) Notice: Subject to any disclaimer, the term of this patent is extended or adjusted under 35 U.S.C. 154(b) by 946 days.

This patent is subject to a terminal disclaimer.

(21) Appl. No.: 13/680,372

(22) Filed: Nov. 19, 2012

(65) Prior Publication Data

US 2013/0219692 A1    Aug. 29, 2013

Related U.S. Application Data

(63) Continuation-in-part of application No. 12/393,340, filed on Feb. 26, 2009, now Pat. No. 8,336,182.

(60) Provisional application No. 61/031,421, filed on Feb. 26, 2008.

(51) Int. Cl.
*B23Q 3/00* (2006.01)
*B25B 11/00* (2006.01)
*B25B 9/02* (2006.01)

(52) U.S. Cl.
CPC ............ *B25B 11/00* (2013.01); *B25B 9/02* (2013.01); *Y10T 29/49998* (2015.01)

(58) Field of Classification Search
USPC ........................................ 269/310
See application file for complete search history.

(56) References Cited

U.S. PATENT DOCUMENTS

| | | | | |
|---|---|---|---|---|
| 1,816,301 A | * | 7/1931 | Sundell | F16B 2/245 24/339 |
| 1,970,016 A | | 8/1934 | Morton | |
| 2,324,803 A | * | 7/1943 | Snyder | B25B 5/006 24/569 |
| 2,452,406 A | * | 10/1948 | Volkery | A01K 75/04 24/329 |
| 2,911,707 A | | 11/1959 | Almen | |
| 3,066,385 A | | 12/1962 | Vana | |
| 4,080,854 A | | 3/1978 | Peterson | |
| 4,503,972 A | * | 3/1985 | Nelligan | B25H 3/003 206/369 |
| 4,565,192 A | * | 1/1986 | Shapiro | A61B 17/158 606/82 |
| 4,573,471 A | * | 3/1986 | Rudner | A61B 17/11 24/569 |

(Continued)

*Primary Examiner* — Alvin Grant
(74) *Attorney, Agent, or Firm* — Sand & Sebolt (57) ABSTRACT

A device and method for holding a bit for a tool. The holding device, which is secured to a support surface, includes a housing having a base, a first leg and a second leg. A slot is defined between the first and second legs and the shank of the bit is received through one of a plurality of differently dimensioned apertures defined along the slot between the first and second legs. An adjustment assembly is engaged with the first and second legs and is movable to a first position to clamp the shank in the selected aperture; and is movable to a second position to release the shank. When the adjustment assembly is moved from the second position to the first position, a free end of the second leg bends toward the first leg, thereby reducing the diameter of the aperture within which the shank is received.

26 Claims, 5 Drawing Sheets

(56) References Cited

U.S. PATENT DOCUMENTS

| | | | | |
|---|---|---|---|---|
| 4,607,829 A * | 8/1986 | Suska | | B25B 5/003 |
| | | | | 269/152 |
| 4,922,603 A * | 5/1990 | Kosmowski | | B23B 31/14 |
| | | | | 206/379 |
| 5,092,572 A * | 3/1992 | Litwak | | A61F 2/28 |
| | | | | 269/253 |
| 5,630,576 A * | 5/1997 | Williams | | B25B 5/006 |
| | | | | 269/296 |
| 5,743,734 A * | 4/1998 | Heath | | A61C 3/04 |
| | | | | 206/369 |
| 5,769,556 A * | 6/1998 | Colley | | B62H 3/02 |
| | | | | 24/335 |
| 5,816,568 A * | 10/1998 | Fox | | B25B 5/14 |
| | | | | 269/111 |
| 6,254,077 B1 * | 7/2001 | Riley, Jr. | | B25B 5/10 |
| | | | | 269/156 |
| 6,276,047 B1 | 8/2001 | Webster et al. | | |
| 7,159,496 B2 * | 1/2007 | Maes | | B23D 45/12 |
| | | | | 269/41 |
| 7,722,608 B2 | 5/2010 | Steiner et al. | | |
| 7,780,668 B2 * | 8/2010 | Steiner | | A61F 2/4644 |
| | | | | 269/87 |
| 8,336,182 B2 * | 12/2012 | Van Valkenburg | | B23C 5/10 |
| | | | | 29/281.1 |
| 2001/0021824 A1 * | 9/2001 | Marsh | | A61B 17/3401 |
| | | | | 604/164.09 |
| 2007/0000165 A1 * | 1/2007 | Nyland | | A01K 87/08 |
| | | | | 43/21.2 |
| 2007/0135917 A1 * | 6/2007 | Malinin | | A61B 17/1604 |
| | | | | 623/16.11 |
| 2008/0169594 A1 * | 7/2008 | Malin | | B23Q 3/103 |
| | | | | 269/55 |
| 2008/0215052 A1 | 9/2008 | Steiner et al. | | |
| 2008/0255623 A1 | 10/2008 | Steiner et al. | | |
| 2009/0294600 A1 * | 12/2009 | Dodge | | F16L 3/24 |
| | | | | 248/73 |
| 2013/0266503 A1 * | 10/2013 | Baek | | C01B 31/0469 |
| | | | | 423/448 |
| 2014/0015181 A1 * | 1/2014 | Murphy | | B23K 37/04 |
| | | | | 269/9 |

* cited by examiner

DEVICE AND METHOD FOR HOLDING A TOOL BIT

CROSS-REFERENCE TO RELATED APPLICATIONS

This application is a Continuation-in-Part of U.S. patent application Ser. No. 12/393,340, filed Feb. 26, 2009, now U.S. Pat. No. 8,336,182, which claimed priority from U.S. Provisional Patent Application Ser. No. 61/031,421, filed Feb. 26, 2008, the disclosures of which are incorporated herein by reference.

BACKGROUND OF THE INVENTION

Technical Field

The present invention relates to a system and device for holding a bit for a tool so that the bit may be disassembled, re-assembled or cleaned when held. The invention also relates to a method of holding the bit using the holding device.

Background Information

A router is a tool, especially used in the woodworking industry, used for milling or hollowing out an area in the face of a work piece. Usually the material used in the fabrication of the work piece is wood or metal, but applying the router to other types of materials is also possible. There are several different types of routers. Nowadays, one of the more common types of router is a spindle router where a router bit is mounted onto a rotatable spindle that is rotatably engaged with an electric motor.

A typical router set-up includes a frame for supporting the router table. The router is mounted to the frame or table in such a way that the router bit will extend through an opening in the table. The work piece to be machined is supported by the table and is positioned so that the router bit will engage the work piece. Different bit sizes and shapes can be used, and the bit is easily exchangeable. The bit is engaged by a collet which is a part of the rotatable spindle that is connected to a motor drive on the router. The router collet and router bit mounted in the mouth of the collet are rotated by the motor drive round an axis perpendicular to the router table. Sometimes the position of the collet may be adjusted relative to the table, in a direction along the axis of rotation. In this case, the shape of the cut that is created by the bit is determined by the size and shape of the bit's cutter and the height of the bit relative to the upper surface of the router table.

One of the important variables determining the router's work is the shape of the router bit, particularly the configuration of the cutting surfaces and spacers that form the bit. A large variety of different router bits are available on the market, allowing an almost indefinite number of shapes to be routed into the work piece. One type of router bit is the so-called "stacked" router bit. Typically, a stacked router bit consists of a central shank which has a threaded top end onto which are mounted one or more removable bit elements. These bit elements include, but are not limited to, disc shaped cutters, ball bearings for guidance and/or various shims or spacers. To keep the stack of cutters and spacers firmly engaged on the shank, an end nut or similar device is tightened on top of the shank.

Adding or removing bit elements such as spacers or shims in between cutter elements modifies the thickness of wood removed in the routing process or the depth of cut in case of a ball bearing diameter change. The operator can select a variety of differently shaped cutters, or include various other types of bit element to change the overall profile routed into the work piece. In order to change the bit elements, it is necessary for the nut on the stacked router bit to be loosened and then the user may alter the number and type of bit element on the shank. Once the desired stack of bit elements is created, the nut is replaced on the end of the shank and is tightened. The shank is then engaged in the router collet and the router is activated.

The operation of disassembling and/or re-assembling stacked router bits while keeping the router bits chucked into the router is cumbersome for various reasons. First of all, unless the router itself is securely held, for instance in a base element such as a router table, it will tend to turn when the user applies torque to unscrew or refasten the end nut. While the router can be secured against turning, this tends to prevent the router table from being set up for alternative operations. Moreover, when the operation is performed in case the stacked router bit is clamped by the collet of the router, small parts, such as spacers, washers etc. may fall into the router motor housing. Furthermore, during the time interval wherein the router bit is chucked in the router collet for disassembling or re-assembling it, the router cannot be used for other purposes, such as milling another work piece. A further drawback is that the visibility is less than ideal, because the router collet generally cannot protrude far enough above the router table to allow a full and unencumbered view of the operation.

Alternatively, the stacked router bit could be held by a clamping element such as a hand plier or a steel bench vise. Generally, however, these clamping elements are less capable of resisting the considerable torque required to unscrew and re-fasten the end nut. Besides, these clamping elements will tend to engage directly on the router bit shank in such a manner that the risk is present to destroy the integrity of the bit's shank and to render it useless or even dangerous for further usage.

One device proposed in the prior art is that disclosed in a copending and allowed U.S. patent application to the present inventor, namely, U.S. patent application Ser. No. 12/393, 340, the entire specification of which is incorporated herein by reference. This application describes the use of a holding device which includes a housing to be secured to a stationary base, such as the router table, and a clamping mechanism for releasably clamping the shank of the bit to the housing so that the bit may be disassembled, reassembled or simply held in a suitable position so that the cutter elements may be cleaned. In particular, the housing disclosed in this application defines a recess that is spaced from the peripheral edges of the housing. A movable element and stationary element are arranged inside the recess. The stationary gripping element includes a gripping area that is configured to engage the bit's shank. The movable element is rotated in a first direction within the recess to clamp the bit's shank in the gripping area. When the movable element is rotated in a second direction, the bit's shank is no longer clamped in the gripping area and is free to be withdrawn from the recess.

While the above holding device works well, there is still a need in the art for a device that is configured to engage a shank of a stacked router bit and tightly hold the shank against rotation during disassembly, reassembly or cleaning of the router bit.

BRIEF SUMMARY OF THE INVENTION

A device and method for holding a bit for a tool. The holding device, which is secured to a support surface, includes a housing having a base, a first leg and a second leg.

A slot is defined between the first and second legs and the shank of the bit is received through one of a plurality of differently dimensioned apertures defined along the slot between the first and second legs. An adjustment assembly is engaged with the first and second legs and is movable to a first position to clamp the shank in the selected aperture; and is movable to a second position to release the shank. When the adjustment assembly is moved from the second position to the first position, a free end of the second leg bends toward the first leg, thereby reducing the diameter of the aperture within which the shank is received.

BRIEF DESCRIPTION OF THE SEVERAL VIEWS OF THE DRAWINGS

A preferred embodiment of the invention, illustrated of the best mode in which Applicant contemplates applying the principles, is set forth in the following description and is shown in the drawings and is particularly and distinctly pointed out and set forth in the appended claims.

Similar numbers refer to similar parts throughout the drawings.

DETAILED DESCRIPTION OF THE INVENTION

Referring to FIGS. 1-6 there is shown a holding device in accordance with the present invention, generally indicated at 10. Holding device 10 is configured to receive and retain a rotary device, such as a router bit 12 therein and to restrain the same against movement. Router bit 12 includes cutter and/or spacer elements 12a (hereinafter cutter elements 12a) and a shank 12b. Particularly, holding device 10 is configured to receive and retain the shank 12b of router bit 12 therein, as will be further described herein. More specifically, holding device 10 is configured to clampingly engage shank 12b and substantially prevent it from rotating as cutter elements 12a are assembled on shank 12a or are disassembled therefrom, or bit 12 is simply held in an upright position so that particulate material removed by cutter elements 12 during a routing operation are cleaned from bit 12.

Holding device 10 comprises a generally U-shaped housing fabricated out of a strong durable material, such as stainless steel. Holding device 10 has a top surface 10a, a bottom surface 10b (FIG. 4), a first end 10c, a second end 10d, a first side 10e, and a second side 10f. Preferably, top surface 10a and bottom surface 10b are spaced a distance apart and are disposed substantially parallel to each other. First and second ends 10c, 10d are spaced a distance apart and are disposed substantially parallel to each other. Finally, first and second sides 10e, 10f are spaced a distance apart and are disposed substantially parallel to each other. Holding device 10 has a length "L" (FIG. 2) as measured between first and second ends 10c, 10d and has a longitudinal axis "Y" extending therebetween. Preferably, length "L" is around 130 mm and the thickness of holding device 10 as measured between top and bottom surfaces 10a, 10b is approximately 22 mm.

In accordance with a specific feature of the present invention, the U-shaped housing includes a base 14 and first and second legs 16, 18 which originate in base 14 and extend longitudinally outwardly away therefrom. Base 14 extends longitudinally from second end 10d of holding device 10 for a length "L1" inwardly away therefrom and toward first end 10c. Base 14 furthermore extends laterally between first and second sides 10e, 10f. The size of length "L1" is only a fraction of the entire length "L" of holding device 10.

First leg 16 originates in a first end at base 14 and extends longitudinally therefrom, terminating in a free end 16a proximate first end 10c of holding device. Second leg 18 originates in a first end at base 14 and extends longitudinally therefrom, terminating in a free end 18a proximate first side 10c of holding device. First side 10e includes an exterior surface of first leg 16. First leg 16 further includes an interior surface 16b which is disposed substantially parallel to first side 10e. Substantially the entire length of first side 10e is substantially flat. Second side 10f includes an exterior surface of second leg 18. Second leg 18 further includes an interior surface 18b which is disposed substantially parallel to second side 10f. Second side 10f is flat along most of its length but is curved for a region proximate first end 18a of second leg 18. The curved region is indicated by the reference character 18c. Curved region 18c includes two indentations which flank a central convex region.

Figure 2:
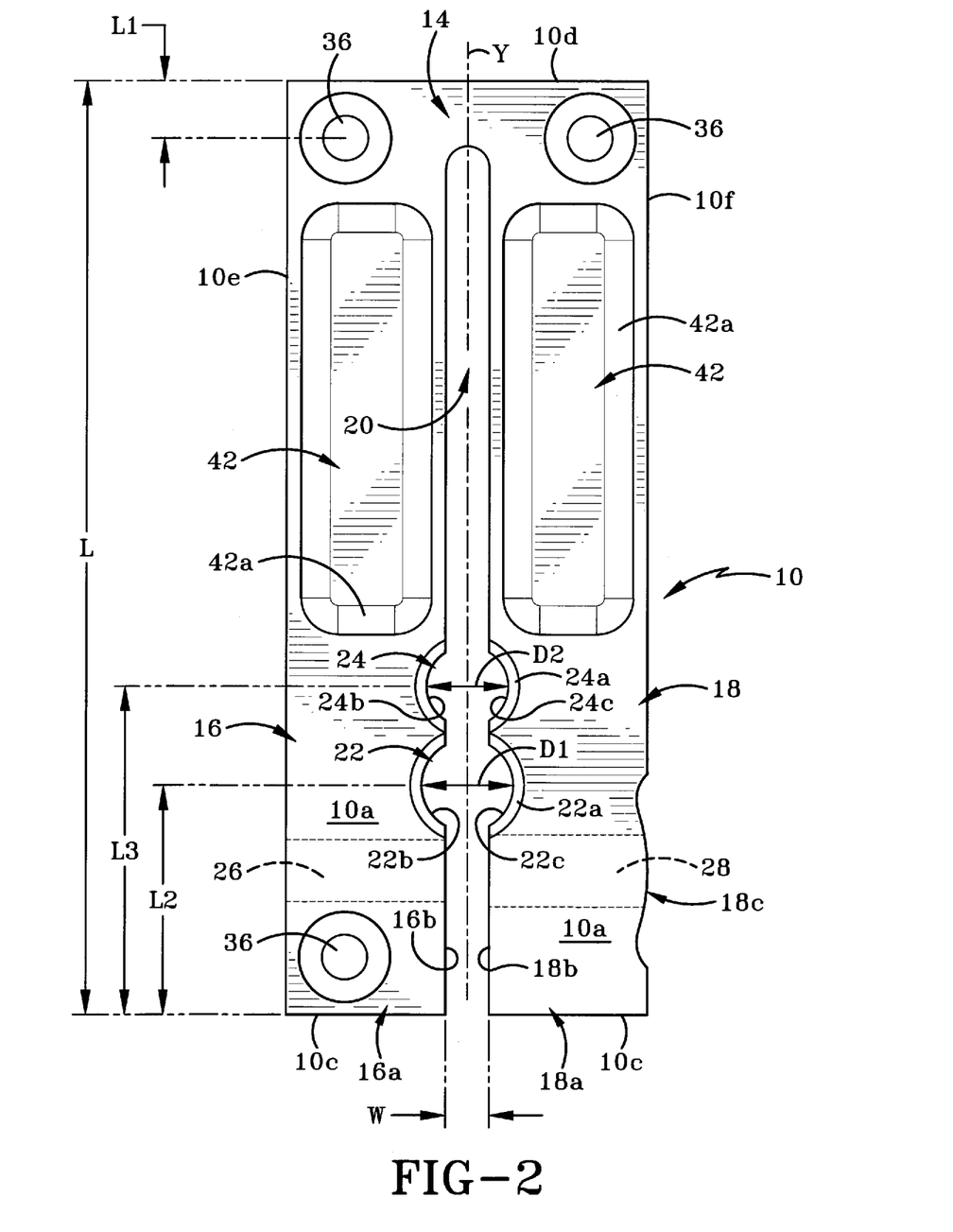
FIG. 2 is a top view of the holding device.
Figure 3:
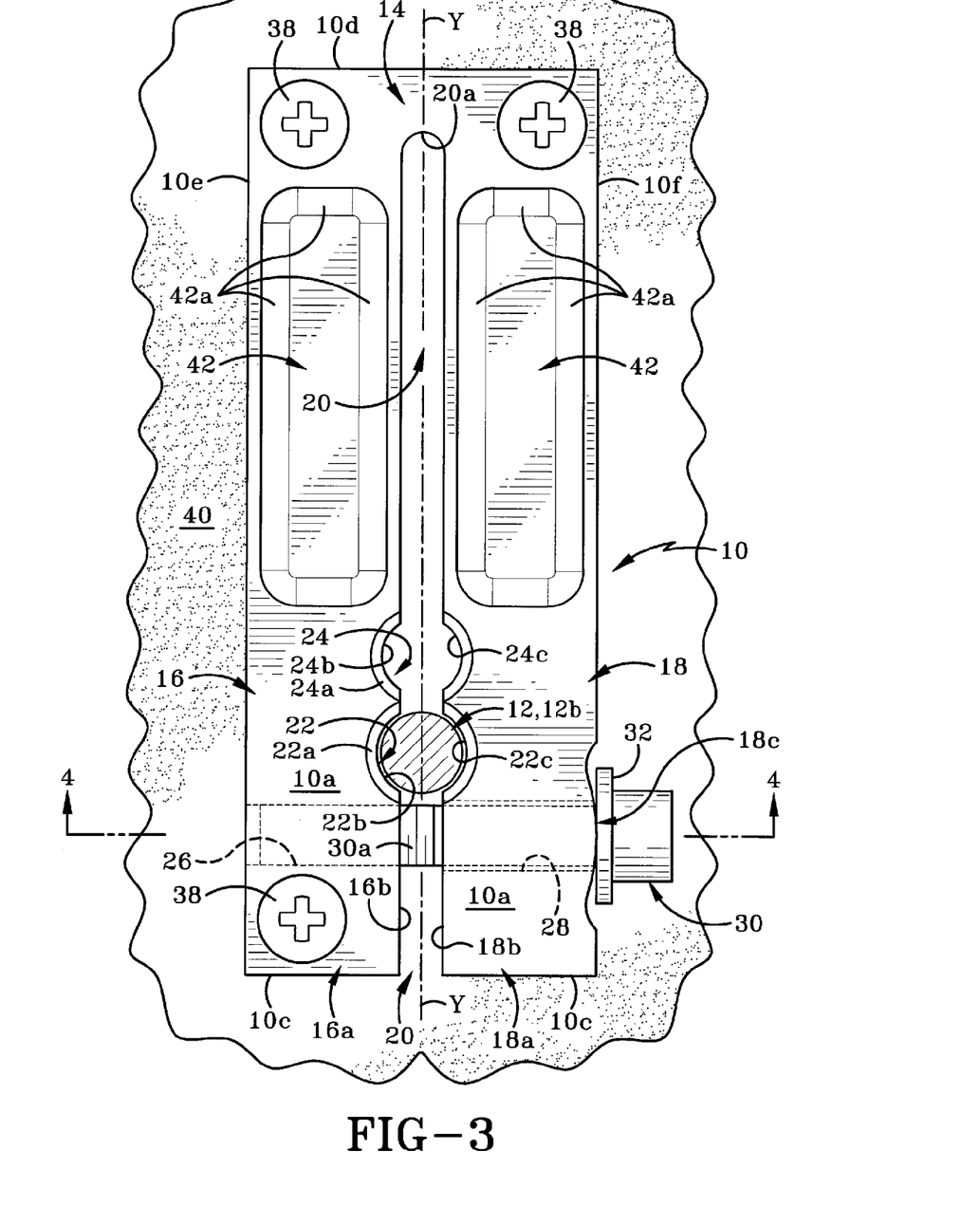
FIG. 3 is a top view of the holding device showing a router bit shank engaged in the first aperture defined in the holding device with the holding device in a first, at-rest position.

A slot 20 is defined between interior surfaces 16b, 18b of first and second legs 16, 18. Slot 20 originates in an innermost end 20a defined in base 14 and extends to the free ends 16a, 18a of first and second legs 16, 18, terminating at first end 10c. FIGS. 2 and 3 show holding device 10 in a first at-rest position. In this first position, slot 20 is of a width "W" (FIG. 2) for substantially the entire length of first and second legs 16, 18, with the exception of one or two regions, as will be described hereafter. Preferably, width "W" is approximately 6 mm in size and the length of each of the first and second legs 16, 18 is approximately 114 mm. The region of base 14 between innermost end 20a of slot 20 and second end 10d of holding device 10 acts as somewhat of a hinge region between first and second legs 16, 18. This hinge region permits the free end 16a, 18a of one or both of first and second legs 16, 18 to move toward and away from the other free end 16a, 18a thereof as will be described herein.

In accordance with a specific feature of the present invention, holding device 10 defines at least one aperture therein which extends between top and bottom surfaces 10a, 10b. In the preferred embodiment of the present invention shown in the attached figures, holding device 10 defines a first aperture 22 therein and a second aperture 24 therein. (It will be understood that holding device 10 may define only one or the other of first and second apertures 22, 24 or may define more than two apertures therein, without departing from the scope of the present invention.) First and second apertures 22, 24 are centered along the midline of slot 20 as shown in FIG. 2.

In particular, interior surface 16b of first leg 16 defines two recessed regions 22b, 24b which extend from top surface 10a of holding device 10 to bottom surface 10b thereof. Recessed regions 22b, 24b preferably are semi-circular or concave when viewed from the top. The portion of interior surface 16b which defines recessed region 22b, 24b preferably is disposed at right angles to top and bottom surfaces 10a, 10b. Similarly, interior surface 18b of second leg 18 defines two recessed regions 22c, 24c which are disposed opposite recessed regions 22b, 24b, respectively. Recessed regions 22c, 24c extend from top surface 10 to bottom surface 10b and are disposed generally at right angles relative thereto. Recessed regions 22c, 24c preferably are semi-circular or concave when viewed from the top. First aperture 22 is therefore defined by recessed regions 22b, 22c and a portion of slot 20. Second aperture 24 is defined by recessed regions 24b, 24c and a portion of slot 20. The center of first aperture 22 is disposed a distance "L2" from first end 10c and the center of second aperture 24 is disposed a distance "L3" from first end 10c. Distance "L2" preferably is around 32 mm and distance "L3" preferably is around 46 mm. First aperture 22 has a chamfered upper region 22a and second aperture 24 has a chamfered upper region 24a. Chamfered regions 22a, 24a are angled so that the shank 12b of router bit 12 is directed thereby into the respective selected one of the first and second apertures 22, 24.

In accordance with yet another specific feature of the present invention, first and second apertures 22, 24 are of different diameters. As illustrated in FIG. 2, the diameter "D1" of first aperture 22 is larger than the diameter "D2" of second aperture 24. (It will be understood that first aperture 22 may instead be of a smaller diameter than second aperture 24 but this different configuration is not illustrated in the attached figures.) The diameters "D1" and "D2" are both larger than the width "W" of slot 20. By way of example only, diameter "D1" is around ½" and diameter "D2" is around 12 mm. In other words, first aperture 22 is sized to be suitable for engagement of a shank 12b that is fabricated in accordance with imperial measurements and second apertures 24 is sized to be suitable for engagement of shanks that are fabricated in accordance with metric measurements. The difference in diameter between the first and second apertures 22, 24 in the preferred embodiment is almost imperceptible to the human eye.

In accordance with yet another feature of the present invention, first leg 16 defines a first hole 26 (FIG. 3) which originates in first side 10e and terminates in interior surface 16b which defines a portion of slot 20. Second leg defines a second hole 28 which originates in curved region 18c of second side 10f. Second hole 28 terminates in interior surface 18b which defines a portion of slot 20. First and second holes 26, 28 preferably are oriented at right angles to longitudinal axis "Y" and are aligned with each other.

In accordance with a specific feature of the present invention, the portion of first leg 16 which defines first hole 26 preferably is threaded so that first hole is internally threaded. The portion of second leg 18 which defines second hole 28 preferably is smooth. Holding device 10 further includes a fastener 30 and a washer 32. Preferably fastener 30 is a bolt which has a terminal region with external threads 30a thereon. Fastener 30 is inserted through hole 32a (FIG. 3) of a washer 32, through second hole 28 in second leg 18, and into first hole 26 of first leg 16 where threads 30a engage threads in first hole 26.

Figure 4:
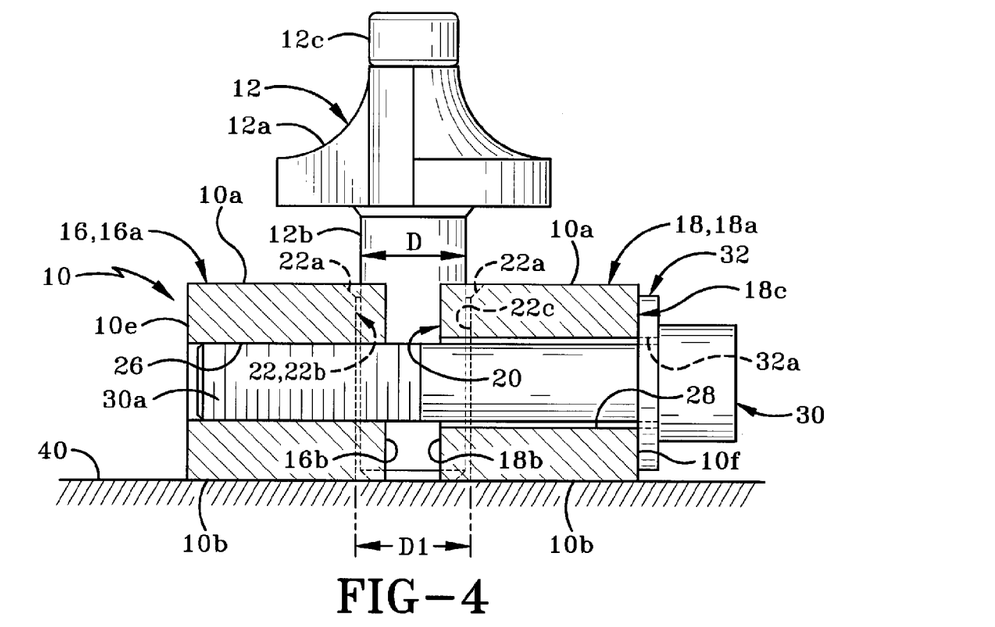
FIG. 4 is a front cross-section of the holding device taken along line 4-4 of FIG. 3.

In accordance with yet another feature of the present invention, holding device 10 defines a plurality of apertures 36 (FIG. 2) therein. Preferably, holding device 10 defines three apertures 36 and each aperture 36 extends from top surface 10a through to bottom surface 10b of holding device 10. Preferably, a pair of the apertures 36 is defined in base 14 and the third aperture 36 is defined in free end 16a of first leg 16 in a location where the third aperture does not intersect first hole 26 (FIGS. 2 and 4). The apertures 36 in base 14 are located proximate the corners thereof i.e., in the regions adjacent where second end 10d intersects each of the first and second sides 10e, 10f. Each of the three apertures 36 is configured to receive a fastener 38 therethrough. Fasteners 38 are used to fixedly secure holding device 10 to a support surface 40, such as the upper surface of a router table or work bench, for example.

Holding device 10 further preferably defines one or more recesses 42 in top surface 10a thereof. Recesses 42 may be of any configuration but as illustrated are longitudinally extending rectangular recesses. Recesses 42 provide a convenient place on holding device 10 for the user to place small component parts, such as cutter sections 12a, which are to be incorporated into the router bit 12 when it is assembled, or which are removed from router bit 12 when it is disassembled. Each recess 42 is bounded by a beveled peripheral wall 42a that extends upwardly away from the bottom surface of the recess 42 and connects to top surface 10a of holding device 10. Peripheral wall 42a directs the small component parts toward the bottom surface of recess 42, thereby making the parts readily available to the user during assembly, and preventing the parts from rolling off top surface 10a of holding device 10.

Figure 1:
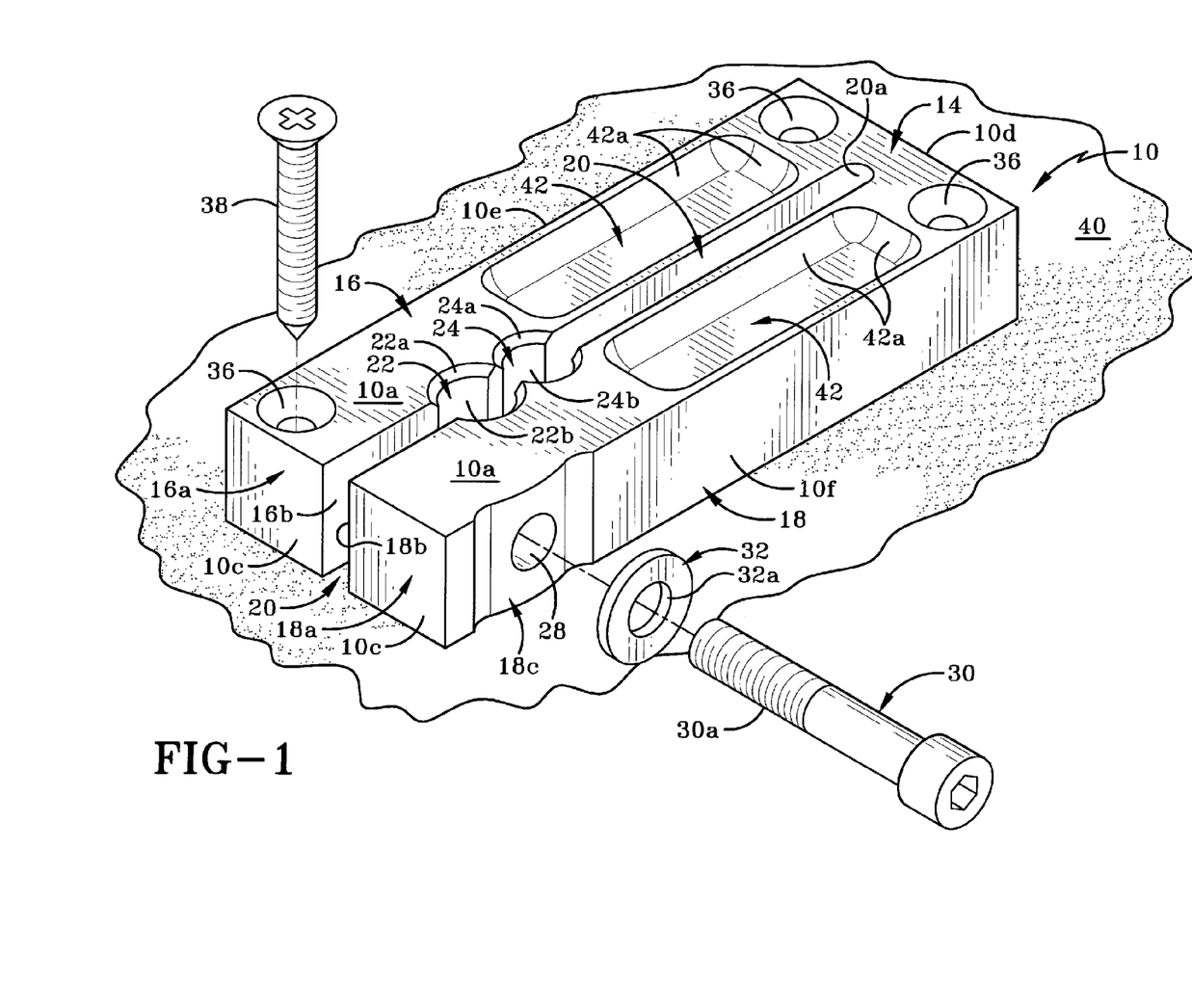
FIG. 1 is a partially exploded perspective view of a holding device in accordance with the present invention shown positioned on a support surface.

Holding device 10 is used in the following way. Holding device 10 is placed on a support surface 40 as shown in FIG. 1, and fasteners 38 are inserted through the three apertures 36 to secure holding device 10 to support surface 40. This ensures that holding device 10 will not move on support surface 40 in response to torque applied to a router bit 12 retained within holding device 10. If the router bit 12 is fully assembled and the user desires to change the configuration of the cutter sections 12a, for instance, shank 12b of the fully assembly router bit 12 is inserted into one or the other of the first and second apertures 22, 24. (It will be understood that the user will select only one of these two apertures 22, 24 as both apertures cannot receive a shank of a bit therein at the same time or the device will cease to function in the manner contemplated by the inventor.) The user will select which of the first and second apertures 22, 24 to use based on the diameter of the shank 12b. In particular, the user will select that one of the two apertures 22, 24 that is closest in diameter to the diameter "D" of shank 12b.

In the figures attached hereto, the aperture selected by the user is the first aperture 22 as the diameter "D1" thereof more closely approximates the diameter "D" of shank 12b (FIG. 4). FIGS. 3 and 4 show shank 12b of router bit 12 inserted into first aperture 22 so that shank 12b is disposed generally at right angles to top surface 10a of holding device 10. Holding device 10 is in a first, at rest position. In this first position, shank 12b is loosely received within first aperture 22 but is not clampingly locked into the same, and shank 12b may therefore be easily and readily removed from first aperture 22.

Figure 5:
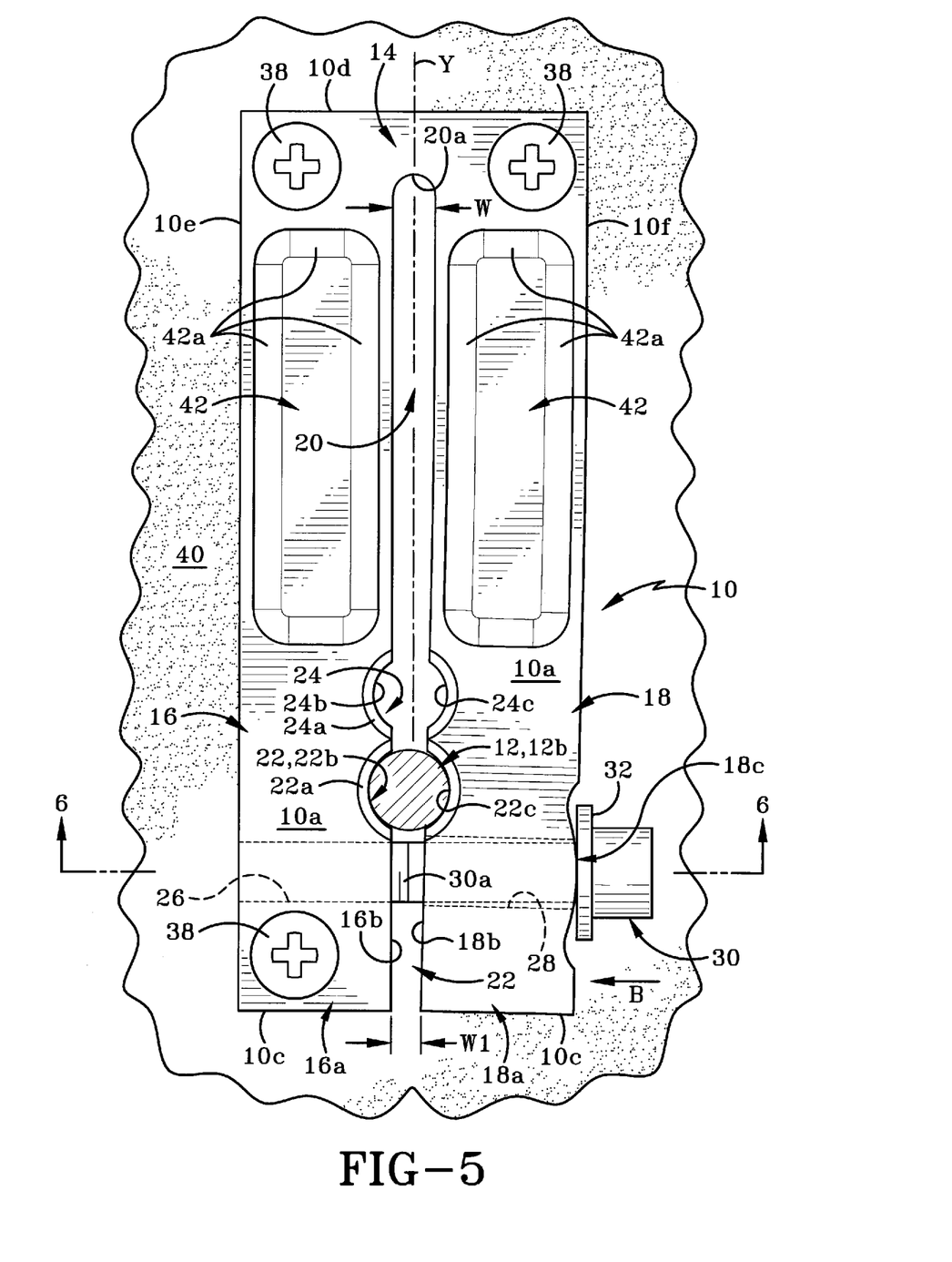
FIG. 5 is a top view of the holding device showing the router bit shank engaged and clamped in the first aperture, and showing the holding device in a second, clamping position.
Figure 6:
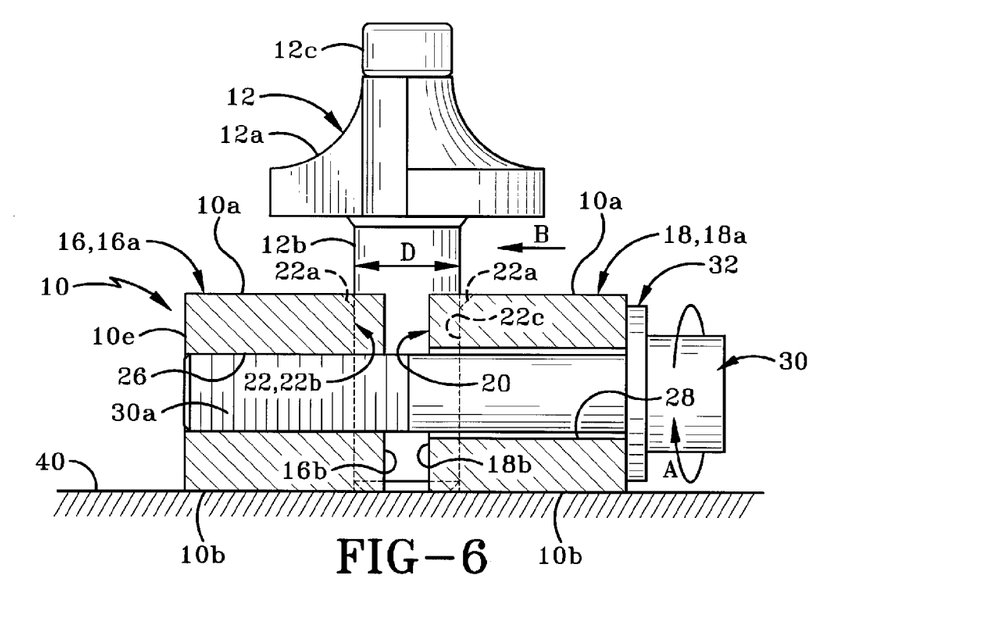
FIG. 6 is a front cross-section of the holding device taken along line 6-6 of FIG. 5.

In order to secure shank 12b within holding device 10 against rotation so that bit 12 will not rotate when torque is applied thereto, the user rotates fastener 30 in the direction of arrow "A" (FIG. 6). This rotational motion causes the threaded free end of fastener 30 to advance further into first hole 26 in first leg 16 (FIG. 6). When this occurs, free end 18a of second leg 18 is drawn toward first leg 16 in the direction indicated by arrow "B". Free end 18a of second leg 18 tends to move laterally toward free end 16a of first leg 16 because free end 16a of first leg 16 is fixedly secured to support surface 40 but free end 18a of second leg 18 is not secured thereto. The movement of second leg 18 tends not to be movement that is substantially parallel to first leg 16 but is instead at an angle relative thereto. The overall effect is that second leg 18 tends to bend along its length toward first leg 16. This bending movement is not necessarily visible to the naked eye but can be felt by the user as they rotate fastener 30, as will be described later herein. The bending of second leg 18 is illustrated in FIG. 5 in a slightly exaggerated fashion for the sake of explanation only. FIG. 5 shows that the width of slot 20 between the first ends of first and second legs 16, 18 (i.e., the regions adjacent base 14) is of a size "W" but the width of slot 20 between free ends 16*a*, 18*a* is smaller and is of a size "W1". In other words, the size of the space between first and second legs 16, 18 narrows from the base region 14 of holding device 10 toward the first end 10*c* thereof. The relative movement between free ends 16*a* and 18*a* may be quite small, in the order of approximately 0.5-2 mm, particularly if holding device is fabricated from stainless steel.

It will be understood that the degree of bending of second leg 18 toward first leg 16 is sufficient to cause a change in the diameter of each of first and second apertures 22, 24. Thus, when fastener 30 is rotated in a first direction "A", it causes free end 18*a* of second leg 18 to bend slightly toward first leg 26, thereby reducing the width "W" of slot 20 in this region to a width "W1", and simultaneously reducing the diameters "D1" and "D2" of first and second apertures 22, 24. Specifically, because shank 12*b* is in first aperture 22, the rotation of fastener 30 is continued until the diameter "D1" of first aperture 22 is reduced to be substantially identical to diameter "D", i.e., to the diameter of shank 12*b*, thus clampingly locking shank 12*b* within first aperture 22. This second, locking position of holding device 10 is illustrated in FIG. 5.

It will be understood that if shank 12*b* is inserted into second aperture 24 instead of first aperture 22, the rotation of fastener 30 would be continued until the diameter "D2" of second aperture 24 approximates the diameter "D". Thus, shank 12*b* would be clampingly locked into second aperture 24. Obviously if this is the case, the diameter of first aperture 22 would simultaneously be reduced to a diameter of less than "D".

Once shank 12*b* is secured by second leg 18 within holding device 10, the user can perform the desired action on bit 12. So, for example, if is desired action is to change the overall stacked configuration of the cutter elements 12*a* of bit 12, the user will rotate the lock nut 12*c* at the top end of bit 12 and add or remove cutter elements 12*a* until the desired configuration is attained. Lock nut 12*c* will then be reengaged and rotated in the opposite direction to secure the various cutter elements 12*a* in place. During the disassembly and re-assembly of bit 12, shank 12*b* is tightly retained within holding device 10 and is prevented from rotating within first aperture 22 as bit 12 is torqued to disengage or re-engage lock nut 12*c*.

When the user wishes to disengage bit 12 from holding device 10 and thereby move holding device from the second locked position (FIG. 5) to the first, at rest position (FIG. 3), fastener 30 is rotated in a second direction opposite to that indicated by arrow "A". This rotation causes a length of fastener 30 to be withdrawn from first hole 26 and permits second leg 18 to move in the opposite direction to arrow "B", thereby returning second leg 18 to its original, at rest position. When second leg 18 moves away from first leg 16, the width of slot 20 defined between free ends 16*a* and 18*a* increases in size from width "W1" to width "W". Simultaneously, the movement causes diameter of first aperture 22 to increase from around "D" in size to around "D1". Because the diameter "D1" of first aperture 22 is greater than the diameter "D" of shank 12*b*, shank 12*b* is released from its engagement with holding device 10 and the user is then able to remove bit 12 from first aperture 22 and re-engage it with a rotary tool (not shown).

The retention of router bit 12 within holding device 10 makes it possible for changes to be made to bit 12 quickly and easily without damaging the various component parts, particularly shank 12*b*.

It will be understood that while the preferred embodiment of the invention is described and illustrated as being fixedly secured to the support surface 40 by way of three fasteners 38 which are inserted through three apertures 36, one or two fasteners 38 could be used instead. For instance, a single fastener inserted through an aperture somewhere around the mid-section of first leg 16 (i.e., somewhere mid-way between base 14 and first end 10*c*) could be sufficient to enable holding device 10 to function in the manner described above. Alternatively, a single fastener could be inserted through an aperture defined in the mid-section of base 14 and another fastener could be inserted through an aperture defined around the mid-section of first leg 16 or in the location identified herein in free end 16*a* of first leg 16. It will of course be understood that additional fasteners could be utilized to secure even the first end 18*a* of second leg 18 to support surface 40. However holding device 10 is configured, the free end 18*a* of second leg 18 must be able to move toward and away from free end 16*a* of first leg 16 in an arcuate fashion. Preferably, this means that free end 18*a* of second leg 18 must be free of attachments to support surface 40 but it is conceived that some type of guided, interlocking, arcuately configured track and groove system between free end 18*a* and support surface 40 could be utilized. Furthermore, it is contemplated that instead of using fasteners 38 to secure holding device 10 to support surface 40, an adhesive or other securement means could be utilized to fixedly secure base 14 and first leg 16 to support surface 40.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention are an example and the invention is not limited to the exact details shown or described.

The invention claimed is:

1. A device for holding a bit for a tool comprising:
   a housing including:
      a base adapted to be secured to a support surface;
      a first leg and a second leg extending outwardly from the base in generally a same direction;
      a slot defined between the first and second legs, wherein a region of the slot is adapted to receive a portion of a shank of the bit therethrough, said slot having a width;
      an adjustment assembly engageable with the first and second legs and being movable between a first position and a second position; wherein movement of the adjustment assembly from the second position to the first position causes a portion of the second leg to move toward the first leg, thereby reducing the width of the region of the slot; and movement of the adjustment assembly from the first position to the second position causes the portion of the second leg to move away from the first leg, thereby increasing the width of the region of the slot; wherein the second leg is disposed substantially parallel to the first leg when the adjustment assembly is in the second position; and the second leg is disposed at an angle relative to the first leg when the adjustment assembly is in the first position; and when the adjustment assembly is in the first position the shank of the bit is clamped in the region of the slot, and when the adjustment assembly is in the second position, the shank is not clamped in the region of the slot.

2. The holding device as defined in claim 1, wherein the portion of the second leg bends toward the first leg when the adjustment assembly is moved from the second position to the first position.

3. The holding device as defined in claim 1, wherein the slot is bounded by an interior surface of the first leg and an opposed interior surface of the second leg; and the region of the slot adapted to receive the portion of the shank therein includes:
   a first curved recess defined in the interior surface of the first leg; and
   a second curved recess defined in the interior surface of the second leg opposite the first curved recess; said first and second curved recesses and the width of the slot therebetween defining a first aperture in the housing, and the first aperture is adapted to selectively receive the portion of the shank therein.

4. The holding device as defined in claim 3, wherein the first aperture is of a first diameter that approximates a diameter of the shank of the bit when the adjustment assembly is in the first position; and the first aperture is of a second diameter that is larger than the shank of the bit when the adjustment assembly is in the second position.

5. The holding device as defined in claim 3, wherein the first aperture extends from an upper surface of the housing to a lower surface of the housing and is oriented at right angles to the lower surface of the housing.

6. The holding device as defined in claim 1, wherein the adjustment assembly engages a free end of the first leg and a free end of the second leg.

7. The holding device as defined in claim 6, wherein the first and second legs extend longitudinally outwardly from the base; and movement of the adjustment assembly from the second position to the first position causes the free end of the second leg to move laterally toward the free end of the first leg.

8. The holding device as defined in claim 1, further comprising:
   a first aperture defined in the base region and extending between an upper and lower surface of the housing;
   a second aperture defined in a free end of the first leg and extending between the upper and lower surfaces of the housing; and
   a pair of fasteners, each fastener being received through one of the first and second apertures and adapted to fixedly secure the housing to the support surface.

9. A device for holding a bit for a tool comprising:
a housing including:
a base adapted to be secured to a support surface;
a first leg and a second leg extending outwardly from the base in generally a same direction;
a slot defined between the first and second legs and wherein a region of the slot is adapted to receive a portion of a shank of the bit therethrough, said slot having a width;
   an adjustment assembly engageable with the first and second legs and being movable between a first position and a second position; and when the adjustment assembly is in the first position the shank of the bit is clamped in the region of the slot, and when the adjustment assembly is in the second position, the shank is not clamped in the region of the slot; wherein the slot is bounded by an interior surface of the first leg and an opposed interior surface of the second leg; and the region of the slot adapted to receive the portion of the shank therein includes:
   a first curved recess defined in the interior surface of the first leg;
   a second curved recess defined in the interior surface of the second leg opposite the first curved recess; said first and second curved recesses and the width of the slot therebetween defining a first aperture in the housing;
   a third curved recess defined in the interior surface of the first leg adjacent the first curved recess; and
   a fourth curved recess defined in the interior surface of the second leg opposite the third curved recess and adjacent the second curved recess; wherein said third and fourth curved recesses and the width of the slot therebetween define a second aperture in the housing; and wherein the housing is adapted to receive the shank of a bit in one or the other of the first and second apertures.

10. The holding device as defined in claim 9, wherein the first aperture is of a first diameter and the second aperture is of a second diameter, and the first diameter is greater than the second diameter.

11. The holding device as defined in claim 10, wherein the adjustment assembly is adjustable to reduce either of the first and second diameters to approximate a diameter of the shank of the bit when the adjustment assembly is moved from the second position to the first position.

12. The holding device as defined in claim 9, wherein both of the first and second apertures extend from an upper surface of the housing to a lower surface of the housing and are oriented at right angles to the lower surface of the housing.

13. The holding device as defined in claim 9, wherein the first diameter is of a size measurable in imperial units and the second diameter is of a size measurable in metric units or vice versa.

14. The holding device as defined in claim 9, wherein the base, the first leg and the second leg are all disposed in a same plane.

15. A device for holding a bit for a tool comprising:
a housing including:
a base adapted to be secured to a support surface;
a first leg and a second leg; a first end of each of the first and second legs originating in and being integrally formed with the base; wherein said first and second legs extend longitudinally outwardly from the base in generally a same direction and each of the first and second legs terminates in a free end that is remote from the base;
a slot defined between an interior surface of the first leg and an interior surface of the second leg; said slot extending from the first ends to the free ends of the first and second legs; and wherein a region of the slot is adapted to receive a portion of a shank of the bit therethrough; and
an adjustment assembly is engageable with the free ends and is movable between a first position and a second position; wherein movement from the second position to the first position causes the free end of the second leg to move laterally toward the free end of the first leg; and movement of the adjustment assembly from the first position to the second position causes the free end of the second leg to move laterally away from the free end of the first leg; and wherein a width of the slot between the first ends is of a substantially constant size when the adjustment assembly is moved between the first and second positions.

16. The holding device as defined in claim 15, wherein the width of the slot between the free ends of the first and second legs changes when the adjustment assembly is moved between the first and second positions.

17. The holding device as defined in claim 15, wherein the adjustment assembly comprises a fastener which extends between the first and second legs; and the fastener is rotatable in a first direction to draw the portion of the second leg toward the first leg; and the fastener is rotatable in a second direction to allow the portion of the second leg to move away from the first leg.

18. The holding device as defined in claim 17, wherein a free end of the first leg defines a first hole therethrough, and a free end of the second leg defines a second hole therethrough; and the first and second holes are substantially laterally aligned with each other; and wherein the fastener is received through the first and second holes.

19. The holding device as defined in claim 18, wherein a terminal region of the fastener is externally threaded and an interior surface of the free end of the first leg which defines the first hole is internally threaded; and the threaded terminal region of the fastener threadably engages in the threaded first hole.

20. The holding device as defined in claim 15, wherein the base, the first leg and the second leg are all disposed in a same plane.

21. A method of holding a router bit; said method comprising the steps of:
provating a holding device for holding the router bit where the device comprises a housing comprised of a base, a first leg and a second leg extending outwardly from the base generally parallel to each other; a slot defined between an interior surface of the first leg and an interior surface of the second leg; said slot having a width; an adjustment assembly engageable with the first and second legs and being movable between a first position and a second position; and at least one aperture defined in the holding device by the first and second legs and a region of the slot; said at least one aperture extending between an upper surface and a lower surface of the first and second legs;
positioning the lower surface of the first and second legs on a support surface;
securing the holding device to the support surface;
inserting a shank of the router bit into the at least one aperture defined in the holding device;
moving the adjustment assembly from the second position to the first position;
moving a free end of the second leg of the holding device from a position where the first and second legs are generally parallel toward a free end of the first leg of the holding device using the adjustment assembly to a position where the second leg is disposed at an angle relative to the first leg; and
clamping the shank in the at least one aperture.

22. The method as defined in claim 21, further comprising holding a first end of the second leg substantially stationary with respect to a first end of the first leg while moving the free end of the second leg toward or away from the free end of the first leg.

23. The method as defined in claim 21, wherein the step of moving the free end of the second leg includes moving the free end of the second leg laterally toward the free end of the first leg.

24. The method as defined in claim 23 wherein the step of securing the holding device to the support surface includes securing the first leg to the support surface prior to moving the second leg toward the first leg.

25. The method as defined in claim 21, wherein the step of moving the free end of the second leg toward the free end of the first leg includes bending the second leg out of parallel arrangement with respect to the first leg.

26. The method as defined in claim 21, wherein the step of moving the adjustment assembly from the second position to the first position includes the step of:
rotating a fastener which extends between the free ends of the first and second legs in a first direction; and
reducing the diameter of the at least one aperture to a diameter that is substantially complementary to an exterior diameter of the shank of the bit.

* * * * *